Nov. 4, 1958

W. A. BLASER
PREDETERMINED COUNTER WITH MAGNETIC
RESET TO PRESET POSITION 2,858,985

Filed Dec. 27, 1956

INVENTOR.
W. A. BLASER

BY

ATTORNEY

Nov. 4, 1958

W. A. BLASER 2,858,985

PREDETERMINED COUNTER WITH MAGNETIC
RESET TO PRESET POSITION

Filed Dec. 27, 1956

INVENTOR.
W. A. BLASER

BY

ATTORNEY

# United States Patent Office 2,858,985
Patented Nov. 4, 1958

2,858,985
PREDETERMINED COUNTER WITH MAGNETIC RESET TO PRESET POSITION

Wilfred A. Blaser, Davenport, Iowa, assignor to Mast Development Co., Davenport, Iowa, a corporation of Iowa Application December 27, 1956, Serial No. 630,925

6 Claims. (Cl. 235—132)

This invention relates to a counter and more particularly to a counter of the limiter type, which is here defined as similar to a predetermining counter in the main, except that it has the additional capacity of automatically resetting to start after the predetermining actuation has been completed.

The invention features such mechanism as including a plurality of sets of coaxially paired wheels or drums, one wheel in each set comprising a counter wheel and the other a predetermining wheel, and the invention in this respect has for a principal object the provision of yielding means operative normally as a connection between the paired wheels of a set so as to retain the paired wheels in initial angular register but functioning, upon turning of one wheel while holding the other, as stressable means capacitated by such relative turning of the wheels to enable the wheels to recover their initial angular register upon release of the held wheel. It is another object in this respect to employ paired permanent magnets as the yielding stressable means, thus affording a simple connection between paired wheels operative without excessive wind-up and other complications characteristic of springs, weights, etc.

It is a further object of the invention to employ individual selector means for advancing, separately or in any combination, the predetermining wheels to and for releasable retention in selected predetermining positions while holding the respective counter wheels, and thereafter releasing the counter wheels to follow the predetermining wheels to said predetermining positions as the counter wheels recover their register with said predetermining wheels. A still further object is to employ drive and transfer means operative in one phase as the means for holding the counter wheels while the predetermining wheels are selectively positioned, together with means for releasing the drive and transfer means to enable the counter wheels to achieve the aforesaid follow-up or recovery action.

Other objects and advantages of the invention reside in improved control means operative in response to the achievement by the mechanism of various stages in its operation, especially as respects the automatic release of the drive and transfer mechanism or equivalent wheel-holding means when the counter wheels reach zero, for example, in a substractive counter; further improvements in the control means as respects an electrical circuit including an initiating switch and a hold switch functioning upon engagement of the drive and transfer mechanism to permit release of the initiating switch; and simple and novel means for selectively advancing the predetermining wheels to their selected predetermining positions.

The foregoing and other important objects and desirable features, inherent in and encompassed by the invention, will become apparent as a preferred embodiment thereof is disclosed in detail in the ensuing description and accompanying drawings, the several figures of which are described immediately below.

Figure 1 is a plan of the mechanism as enclosed in a suporting casing or the like.

The present disclosure is based upon a three-digit counter employing wheels or drums; although equivalent members could be used. Likewise, as respects the basic numeral system disclosed, representation and not limitation is intended, for any other indicia could be used instead of numbers, or when numbers are used, transfer could very well occur at some number or numbers other than ten, etc. Expressions such as "advance," etc. are used in the interests of convenience, it being noted here that after the counter wheels have been set to the predetermined number, the counting operation is substractive and the predetermined number lessens by one digit per counted impulse until zero is attained. As the description progresses, modifications other than those outlined above will readily suggest themselves, it being thus clear that it is not the intention to limit the invention to the precise illustration and description.

Figure 2:
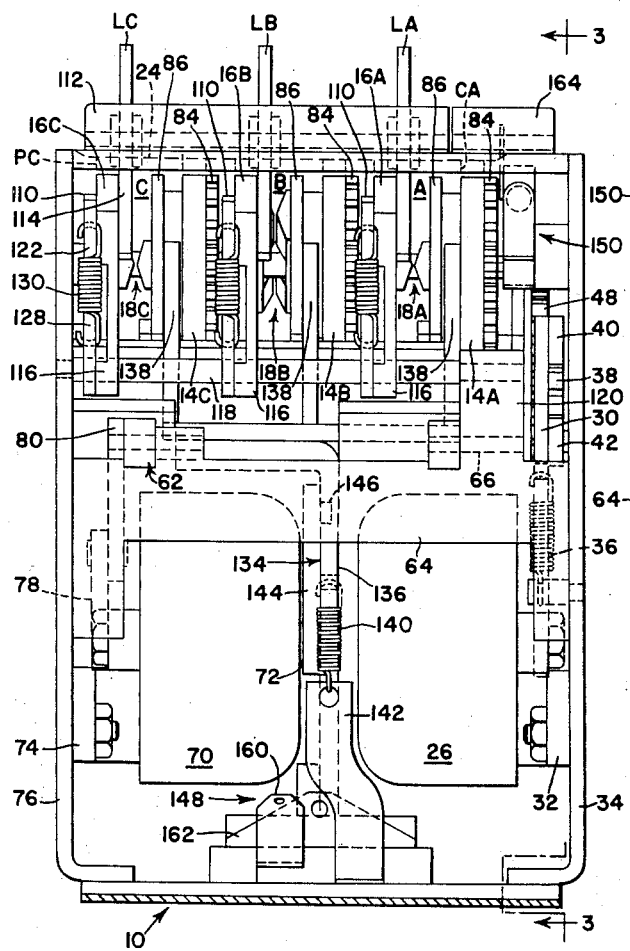
Figure 2 is a section as seen along the line 2—2 of Figure 1.
Figure 3:
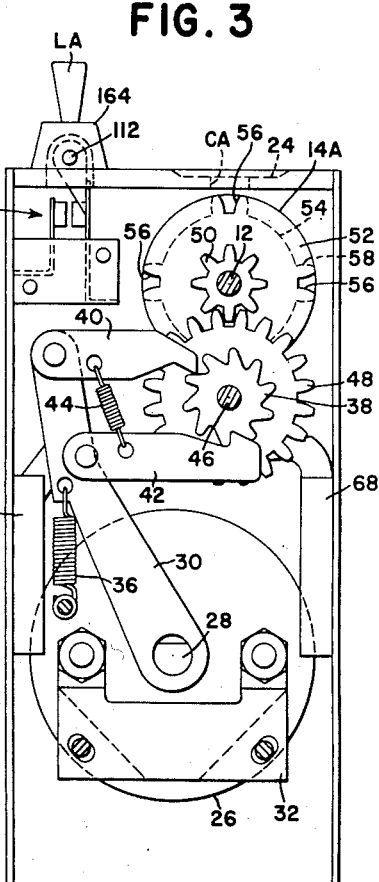
Figure 3 is an end view, partly in section, as seen along the line 3—3 of Figure 2.
Figure 8:
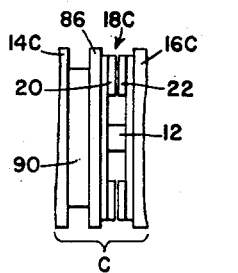
Figure 8 is a view as seen along the line 8—8 of Figure 4.
Figure 8:
Figure 4:
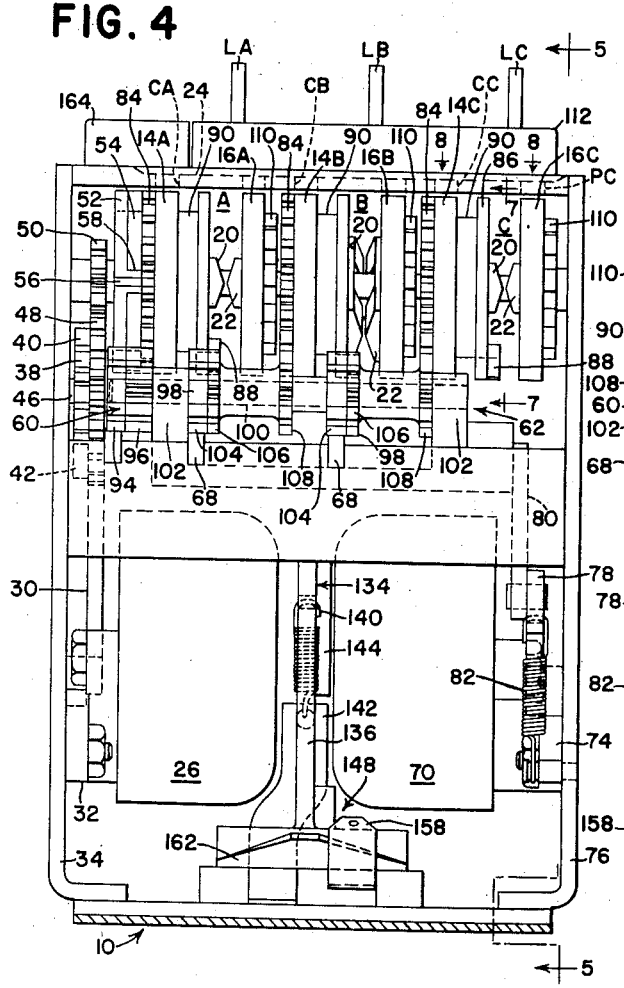
Figure 4 is a section from the opposite side of Figure 2, as seen along the line 4—4 on Figure 1.
Figure 5:
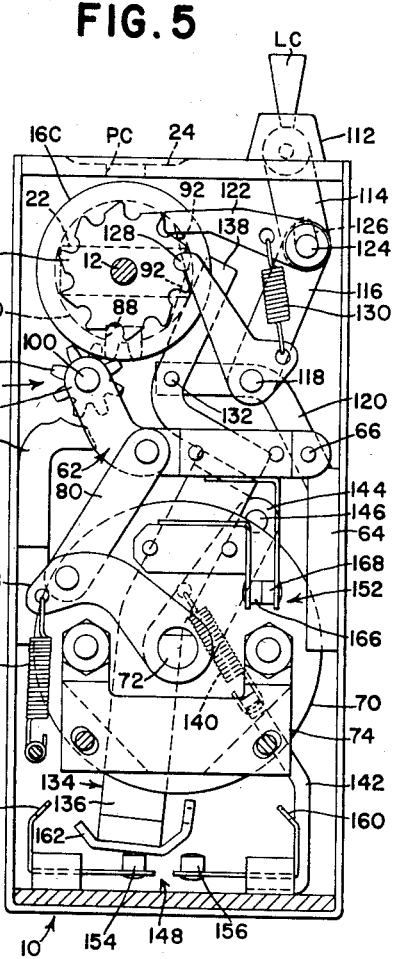
Figure 5 is an end view, partly in section, from the end of the mechanism opposite to Figure 3, as shown by the line 5—5 on Figure 4.

The counter or limiter is at least partially enclosed in and supported by a casing or housing 10, the details of which are not material here beyond the fact that the casing furnishes a support for a plurality, here three, of sets of coaxial members or wheels A, B and C. The casing may include internal additional members for support, but of momentary concern is a shaft 12 on which the wheel sets are journaled. The manner of mounting the shaft is immaterial. The wheel set A includes a counter wheel 14A and a predetermining wheel 16A, each of which is rotatable or turnable relative to the other. The same is true of the wheel sets B and C, which include counter and predetermining wheels 14B and 16B and 14C and 16C, respectively. Although not shown in detail, each wheel is numbered from zero to nine in equal angularly spaced increments and arranged clockwise as seen in Figure 3 (counterclockwise as seen in Figure 5, since Figure 5 is seen from the end opposite the end of Figure 3). As will appear below, the wheels of each set have an initial or starting angular register; i. e., the zero on the wheel 14A is opposite the zero on the companion or paired predetermining wheel 16A, etc. The wheels of each set are normally but yieldably maintained in this angular register by a yielding stressable drive connection, one for each set of wheels and comprising means 18A, 18B and 18C. Each means comprises a pair of permanent magnets 20 and 22, of any suitable commercial magnetic stock, the magnet 20 being secured to the counter wheel and the magnet 22 being secured to the companion predetermining wheel; and the magnets are arranged so that the north and south poles of the magnet 20 are respectively normally opposite the south and north poles of the magnet 22 (Figure 8). As illustrated here, the magnets extend diametrically in a horizontal plane when the paired wheels are in register at zero with the zeros up and visible at a top window 24 in the casing 10.

In operation, if the counter wheel 14A, for example, is held and the predetermining wheel 16A is turned until some number thereon other than zero, say five, appears at the window 24, and the counter wheel then released while the predetermining wheel is held at five, the means comprising the magnets will cause the counter wheel to turn until its number five appears in the window alongside the five on the predetermining wheel. Stated otherwise, the magnet on the counter wheel realines itself with that on the predetermining wheel and the counter wheel follows the predetermining wheel, or recovers its initial angular register. In other words, the magnets 20 and 22 are now again alined at zero, but the zeros on the paired wheels now occupy a common new position angularly spaced from the window 24. Now, with the predetermining wheel held and the counter wheel rotated back to zero, in the example given, and then released while the predetermining wheel is still retained, the counter wheel will spin back to five and will again recover its register with the predetermining wheel. It is upon the foregoing principle that the operation of the limiter is based and, as will appear, this principle may be exploited otherwise than as precisely shown here, while still observing the spirit and scope of the invention.

Although the window 24 may be totally transparent, in which case the wheels and associated mechanism would be visible therethrough, it has been shown opaque except for six rectangles through which only the numerals on the respective wheels are visible. In the interests of clarity, the first set of windows for the wheel set A is marked PA and CA, the second set of windows is PB and CB and the third PC and CC, the P and C standing respectively for "predetermine" and "counter" and the letters A, B and C respectively identifying the wheel set position. As further identification, the numerals on the predetermining wheel may be relatively large and those on the counter wheels small. The foregoing however is not a limitation on the invention and is resorted to here solely for an easy understanding of the relationship among the wheel sets and between the wheels of each set.

Another point that should be observed is that, again in the interests of clarity, the sections of Figures 3 and 5 omit structure lying substantially behind the planes of the respective sections; otherwise, the views would be unduly complicated and cluttered.

The input means by which the counter wheels are driven and transfer effected are shown here as taking the form of a conventional rotary solenoid 26, hereinafter referred to as the count solenoid, having a shaft 28 to one end of which is secured a drive arm 30. This solenoid is mounted via a suitable bracket 32 to a proximate end wall 34 of the casing 10. When the solenoid is deenergized, the arm 30 is retracted to the position shown in Figure 3, as by a spring 36, and, upon energization by any suitable circuit, not shown, activated by the impulses being counted, the solenoid swings the arm in a clockwise arc to advance a ten-tooth wheel 38 by one tooth, or thirty-six degrees, by means of a first pawl 40. Upon deenergization of the solenoid, a second pawl 42 advances the wheel another tooth. A spring 44 interconnects the pawl to furnish the proper engagement of the pawls with the wheel.

The ten-tooth ratchet wheel 38 is journaled on a stub shaft 46 and has integral therewith a twenty-tooth gear 48, which is in constant mesh with an eight-tooth gear 50 journaled on the wheel shaft 12. Coaxially fixed to the eight-tooth gear 50 are a locking disc 52 and an intermittent gear 54, the former having four equally angularly spaced notches 56 and the latter having four correspondingly spaced two-tooth sets 58, the purpose of which will be explained below. Suffice it for the moment to note that this gearing is part of drive and transfer mechanism including transfer means 60 mounted on a shiftable carrier element 62.

This carrier is mounted on the casing 10 via supports 64 including a pair of coaxial pivot shafts 66 parallel to the axis of the shaft 12 but at a lower level, whereby the carrier, together with the transfer means 60, is swingable from the upper position shown in the drawings (see Figure 5) to a lower position limited by stops 68. The position of the carrier is changed by an electrical device or actuator 70, here a conventional rotary solenoid having a shaft 72 projecting at opposite ends thereof. In the interests of compactness, the solenoid 70 is coaxial with the previously described count solenoid 26 and is mounted by a bracket 74 on a proximate casing end wall 76. The solenoid shaft 72, at its end proximate to the wall 76, has keyed thereto a drive arm 78 which is connected by a link 80 to the carrier 62. A spring 82 operates to bias the arm 78 in a counterclockwise direction as seen in Figure 5, or so that the transfer mechanism is disengaged as respects the counter wheels 14A, B and C, but when the actuator is energized, as it is in Figure 5, the arm 78 swings to a limited extent in a clockwise direction to shift the carrier to its engaged position as respects the counter wheels.

Figure 7:
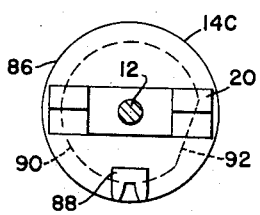
Figure 7 is a section as seen along the line 7—7 of Figure 4.

For the purpose of receiving drive from the transfer mechanism, each counter wheel 14A, B and C has coaxially rigidly secured thereto at one side thereof a twenty-tooth gear 84 and at its other side a single-notched locking disc 86 and a two-toothed intermittent gear 88, the latter comprising simply a lug having two teeth thereon in register with the single notch in the locking disc (Figure 7). Each counter wheel has an annular groove 90, in the nature of a cam having a low or flat spot 92, all of which flats occupy the same angular position when the counter wheels are all at zero, or whatever starting position is selected. The purpose of these cams will appear subsequently.

The first part of the transfer means 60 includes a dual pinion having a four-tooth part 94 and a wide eight-tooth part 96. The former is normally locked up by the locking disc 52 and the latter is meshable at times with the intermittent gear 54 and is in constant mesh with the twenty-tooth gear 84 of the first counter wheel 14A. Hence, as the locking disc and intermittent gear are turned by the eight-tooth input gear 50 when the count solenoid 26 is energized and deenergized, the input is transmitted to the counter wheel gear 84 via the transfer pinion in such manner that each tooth of advance of the ratchet wheel 38 results in one-tenth turn of the counter wheel 14A. Specifically, the ratchet wheel 38 turns thirty-six degrees on each advance, which becomes ninety degrees on the eight-tooth gear 50 because of the twenty-to-eight ratio. This is also ninety degrees on the intermittent gear 54, or two teeth, and that in turn becomes two teeth on the eight-tooth pinion part 96 and two teeth, or one-tenth of a turn, on the counter wheel gear 84. When the counter wheel 14A completes one revolution, as is conventional, it will have turned the next counter wheel 14B one tenth of a turn, so that as the wheel 14A moves from zero to nine (in a subtractive counter), the next wheel 14B simultaneously moves from one to zero (again in a subtractive counter). The transfer from one counter wheel to the next is made, in the three-digit counter here disclosed, by a pair of relatively rotatable transfer pinions 98 journaled on a transfer shaft 100 as is the transfer pinion 94—96; and the shaft 100 is supported at opposite ends in arms 102 formed on the carrier 62. It should be noted at this point that, although the transfer shaft 100 may appear to be a part of the stub shaft 46, it is not, being separate therefrom so as to be shiftable with the carrier 62.

Each pinion 98 has a four-tooth part 104 and a pair of integral eight-tooth parts 106 and 108, duplicating in function the pinion 94—96 in which the eight-tooth part 96 is axially wide instead of being separate like the parts 106 and 108. Nevertheless, they are otherwise alike. The four-tooth part 104 locks up at intervals with the counter wheel locking disc 86, the eight-tooth part 106 meshes at times with the counter wheel intermittent gear lug 88, and the other eight-tooth part 108 is in constant mesh with the next adjacent counter wheel twenty-tooth gear 84. As already described, as the counter wheel 14A completes one revolution, it turns the counter wheel 14B one-tenth of a turn. Likewise, as the counter wheel 14B completes one revolution, it turns the counter wheel 14C one tenth of a turn. The transfer mechanism forms no specific part of the present invention and is therefore referred to only briefly, since it may take any of the well-known commercial forms. When the transfer mechanism carrier 62 is in its engaged position as shown, especially in Figure 5, the transfer pinion parts 96, 108 and 108 are in mesh respectively with the twenty-tooth gears 84 of the counter wheels 14A, B and C. If the drive and transfer mechanism is not driven, it will serve to retain or hold the counter wheels in their respective angular positions. When driven, the mechanism turns the counter wheels in the manner aforesaid.

Each predetermining wheel has coaxially fixed thereto a ten-tooth ratchet wheel 110 and these wheels, together with selector levers LA, LB and LC and operating means connected thereto, afford selector means by which the predetermining operation is achieved. Each lever is rockably carried on a casing-supported pivot shaft and mounting bank assembly 112 and depends into the casing to form an arm 114 of a toggle including a link 116 pivoted to a shaft 118 carried by an extension 120 of the support 64. The other end of the shaft 120 may be carried directly by the casing wall 76. A drive pawl 122 is connected by a pin 124 to the toggle and the arm 114 has a slot 126 therein to accommodate the pin during actuation of the toggle. A holding pawl 128 is pivoted on the shaft 118 and a spring 130 interconnects the two pawls and biases the toggle to the position shown in Figure 5 so that each selector lever normally stands upright, from which position it is manually rocked to the right as seen in Figure 5, or to the left as seen in Figure 3, to advance its predetermining wheel in angular increments of one-tenth turn each time the lever is rocked. The holding pawl not only prevents retrograde turning of its predetermining wheel but also serves as a detent to prevent inadvertent forward overrun.

From the description thus far it will be seen that the predetermining wheels may be individually advanced by their respective selector means to any predetermined position, here a numeral position between zero and nine. The predetermining selection is effected when the counter wheels are free from the drive and transfer mechanism, which is the case when the transfer means carrier 62 is in its down position, or a position below that shown in the drawings. Because of the freedom of the counter wheels from the drive and transfer mechanism, they are free to follow the predetermining wheels under action of the yielding or magnetic means 18A, B and C. For example, and referring to the paired wheels 14A and 16A and assuming that both wheels start with their respective zeros appearing in the windows CA and PA, rocking of the selector lever LA, say five times, will advance both wheels to their respective "five" positions; that is, a "five" will appear in each of the windows CA and PA, because the means 18A serves as a drive connection between the wheels 14A and 16A and that means thus keeps the wheels in register. Therefore, if the wheels are divided into equal angularly spaced increments, for example, and these increments are the same on each wheel, corresponding indicia on the wheels will retain register unless one wheel is turned while the other is held, in which case the register will be temporarily destroyed. However, in such case the means 18A will have been stressed so that when the held wheel is released it will turn in follow-up relation to the other wheel. It is immaterial in which direction the released wheel ultimately turns, since the magnetic means 18A has only one position of register or alinement.

When the counter wheels are in their respective zero or starting positions, their cam flats 92 are in register and as such constitute parts of an automatic control system. For this phase of the invention, the extension 120 on the support 64, and the remote end wall 76, carry a horizontal pivot shaft 132 which rockably mounts a tined control member 134. This member has a central depending leg 136 and three upright tines 138 rigid therewith and respectively in register with the counter wheel annular grooves 90 and thus cooperative respectively with the counter wheel cam flats 92. A tension spring 140 is connected between the member 134 and a casing-mounted bracket 142 to bias the member so that the tines 138 tend to swing toward the counter wheel cam flats 92. Since the tines 138 are rigid on the member 134, it requires the presence of all cam flats in the same position, here the zero positions of the counter wheels, to accept the tines in order to enable biased movement thereof to the left of the position shown in Figure 5.

Another element affecting the position and movement of the member 134 is an arm 144 fixed to the end of the solenoid shaft 72 opposite the arm 78. This arm has a lug or roller 146 at its free end and this lug engages behind the leg 136 of the member 134 as a one-way drive connection tending to bias the member 134 in opposition to the bias imposed by the spring 140. This bias stems from the spring 82, previously described, which acts on the arm 78 and in turn on the solenoid shaft 72 and ultimately on the arm 144. When the solenoid 70 is energized, as it is shown in Figure 5, the effect of the spring 82 is negatived and the spring 140 is effective to tend to swing the member 134 counterclockwise beyond the position shown in Figure 5, but in Figure 5 the middle counter wheel 14B is at its number one rather than its zero position and accordingly its cam flat 92 is not in position to receive the middle tine 138. Therefore, the middle counter wheel is holding the member 134 against final action by the spring 140, it being clear that as soon as all cam flats are properly presented, the spring 140 swings the member 134 counterclockwise, in which respect it should be noted that when the solenoid 70 is energized, the position of the arm 144 is such that the lug 146 is spaced slightly to the right of the right-hand edge of the member 134 so as to permit the motion just described.

Figure 1:
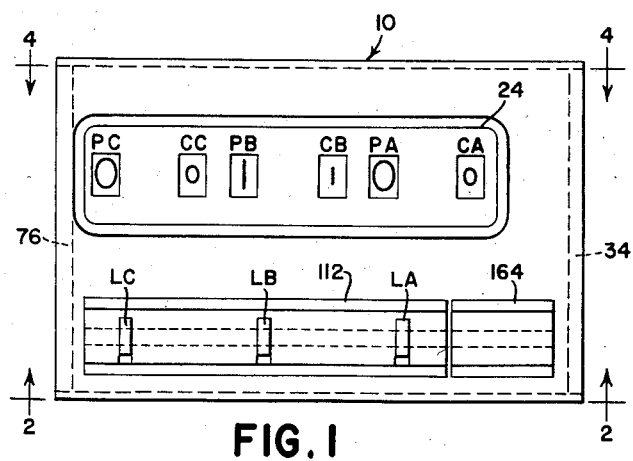
Figure 6:
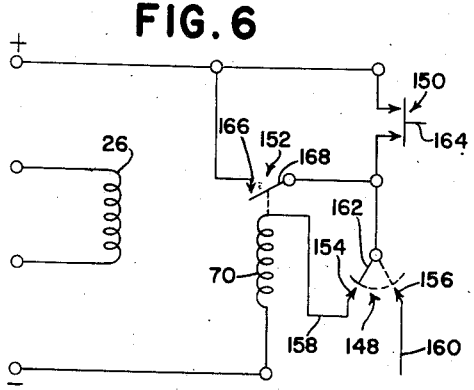
Figure 6 is a representative wiring diagram of the electrical system employed with the electrical control.

The foregoing phase of the control system, which is here effected electrically (see Figure 6), includes a make-before-break switch 148 which is in series with a starting switch 150 and a hold switch 152. The switch 148 includes a pair of contacts 154 and 156 connected respectively by circuit portions 158 and 160 to the solenoid 70 and to a device, not shown, which is responsive to completion of the counting cycle. This switch includes a plate-like controller 162 carried by the lower end of the member 134 and adapted to make one or the other of the contacts 154 and 156, depending upon the position of the member 134. The starting switch 150 is biased to open or "off" position and is closable by a starting button 164 which is mounted on the casing in en banc relation to the mounting bank assembly for the selector levers LA, LB and LC. This button is movable to the left as seen in Figure 3 (down in Figure 1) to close the starting switch and when released immediately opens the starting switch. The hold switch 152 comprises a contact 166 carried by the casing in any suitable manner and a second contact 168 carried by the transfer means carrier 62 in such manner that when the carrier is in its up or drive-engaging position the switch 152 is closed and vice versa. It will be understood that suitable electrical connections are effected in the actual structure to effectuate the wiring diagram of Figure 6, but these are specifically immaterial and need not be shown.

Operation

Let it be assumed that the starting switch 150 is open or in its "off" position, to which it is biased as aforesaid. Hence, the solenoid 70 is deenergized and the spring 82, acting through the arm 78, the solenoid shaft 72 and the arm 144 and lug 146, has swung the member 134 clockwise about its pivot 132 so that the controller plate 162 makes the contact 154 and so that the transfer means carrier 62, via the arm 78 and link 80, is in its down or disengaged position. It will be further assumed that all counter and predetermining wheels are at zero, in which case each counter wheel and its paired predetermining wheel are in angular register. With this as a starting point, the operator selects a predetermining position by rocking the selector levers LA, LB and LC, or any of them, the desired number of times. For example, assume that the predetermining position desired is 1–2–3, in which case the lever LA is rocked three times to advance the wheels 14A and 16A to 3, the lever LB is rocked twice to advance the wheels 14B and 16B to 2 and the lever LC is rocked once to advance the wheels 14C and 16C to 1. It will be understood that the selector means acts only on the predetermining wheels but since the transfer and drive mechanism is disengaged the counter wheels follow their respective predetermining wheels because of the means 18A, B and C.

After the foregoing has been observed, the starting button 164 is moved to close the starting switch 150, which completes the circuit to the solenoid 70, since the switch 148 is already closed across 162—154 by the member 134. Thereupon the solenoid shaft 72 turns clockwise, acting through the arm 78 and link 80 to shift the carrier 62 so as to engage the drive and transfer mechanism with the counter wheel gears 84. As the carrier shifts to its drive-engaging position, it closes the holding switch 152 so that the starting button can be released. When the counter wheels were moved to their one-two-three positions as described above, their cam flats 92 became misalined as to each other and also as to the tines 138 on the member 134; hence, the circular portions of the counter wheel grooves 90 serve as stops preventing counterclockwise pivoting of the member 134 under action of the spring 140. In other words, the member 134 is not stopped by the lug 146 on the arm 144, since the lug 146 is normally spaced to the right of the member 134 to afford a space for counterclockwise movement of the members when the cam flats 92 ultimately accept the tines 138. Until they do, however, the tines merely ride the grooves 90.

The count or input means, including the count solenoid 26, ratchet wheel 38, etc., drives the counter wheels in a subtractive sense, per the example chosen here (clockwise, Figure 5; counterclockwise, Figure 3), until the counter wheels reach 000, the end result of which is to activate the line 160 so that whatever device is made responsive to the end of the counting cycle is suitably controlled, the details of which are not material here. Specifically, what occurs as the counter wheels reach 000 is as follows: first, as the counter wheels are driven reversely from their predetermined positions, they turn relative to the predetermining wheels, which are retained by the pawls 122 and 128 on the now inactive selector means, and thus the drive connections 18A, B and C are stressed or conditioned to return the counter wheels to their starting positions (here 1–2–3 in the example selected) as soon as the counter wheels are freed from the drive and transfer mechanism; second, as the counter wheels attain 000, the cam flats 92 simultaneously receive the tines 138 on the member 134, which at this time is loaded by the spring 140 but which up to this time could not swing counterclockwise beyond the position of Figure 5 because of the lack of register of the cam flats; third, as the cam flats register and the tines 138 are received, the lower end of the leg 136 swings to the right of the Figure 5 position to make contact at 162—156 and thus to activate the line 160 while temporarily retaining contact across 162—154 to the solenoid 70. Now, as the "break" at 162—154 is completed, the solenoid 70 is deenergized and the retract spring 82 takes over to shift the carrier 62 to its down position via the arm 78 and link 80 and to return the member 134 to its Figure 5 position via the arm 144 and lug 146, it being noted that the lug 146 engages the member 134 at a level below the member pivot 132. The attendant results include breaking of the switch 152, as the carrier 62 shifts down to its drive-disengaging position, and breaking of the switch across 162—156 and re-making of the switch across 162—154. Since the carrier 62 disengages the drive to the counter wheels and since the member 134 in swinging clockwise as aforesaid lifts the tines 138 from the cam flats 92, the counter wheels are free to return to their predetermined positions by the drive connections 18A, B and C which, as stated above, were stressed as the counter wheels were driven to 000 relative to the retained predetermining wheels, and the counting cycle may be repeated by momentarily closing the starting switch 150 via the button 164.

The same cycle may be repeated at will, or a new predetermined number may be selected, and in any case the automatic restoration of the system will occur at the end of each cycle, it requiring only a momentary closing of the starting switch 150 to initiate a new cycle.

Summary

The counter disclosed features, as previously described, the simple and novel selector means LA, LB and LC, together with the yielding drive connections 18A, B and C, each of which comprises the paired magnets 20 and 22. These, along with the automatic control, provide a simple and versatile counter of the limiter type. Features other than those categorically enumerated will undoubtedly occur to those versed in the art, as will modifications and alterations in the preferred embodiment of the invention disclosed, all of which may be achieved without departure from the spirit and scope of the invention.

What is claimed is:

1. Mechanism of the class described, comprising: a support; a counter wheel carried by the support for rotation through a cycle including a fixed number of angular increments beginning with a zero position; a predetermining wheel carried by the support coaxially adjacent to and movable relative to the counter wheel through a like cycle including a like number of angular increments beginning with a zero position initially in register with the counter wheel zero position; selector means operative to turn the predetermining wheel relative to the fixed counter wheel so as to establish and fix a new zero position for said predetermining wheel; means operative between the wheels as a yielding driving connection, including a pair of permanent magnets, one on each wheel, and having their opposite poles so related as to initially register the zero positions of the wheels and to ultimately cause the counter wheel to angularly follow the predetermining wheel to its new zero position, said drive connection being stressable by turning of one wheel relative to the other to condition the wheels to recover said register; disengageable means for turning the counter wheel out of its new zero position relative to the predetermining wheel so as to stress said driving connection; and means for disengaging the disengageable means to release the counter wheel for returning in follow-up relation to the fixed predetermining wheel under action of the stressed driving connection so as to recover register of said new zero positions of the wheels.

2. Mechanism of the class described, comprising: a support; a counter wheel carried by the support for rotation through a cycle including a fixed number of angular increments beginning with a zero position; a predetermining wheel carried by the support coaxially adjacent to and movable relative to the counter wheel through a like cycle including a like number of angular increments beginning with a zero position initially in register with the counter wheel zero position; selector means operative to turn the predetermining wheel relative to the fixed counter wheel so as to establish and fix a new zero position for said predetermining wheel; means operative between the wheels as a yielding driving connection, including a permanent magnet on at least one wheel and a magnetically attractable portion on the other wheel so related as to initially register the zero positions of the wheels and to ultimately cause the counter wheel to angularly follow the predetermining wheel to its new zero position, said drive connection being stressable by turning of one wheel relative to the other to condition the wheels to recover said register; disengageable means for turning the counter wheel out of its new zero position relative to the predetermining wheel so as to stress said driving connection; and means for disengaging the disengageable means to release the counter wheel for returning in follow-up relation to the fixed predetermining wheel under action of the stressed driving connection so as to recover register of said new zero positions of the wheels.

3. Mechanism of the class described, comprising: a support; a counter wheel carried by the support for rotation through a cycle including a fixed number of angular increments beginning with a zero position; a predetermining wheel carried by the support coaxially adjacent to and movable relative to the counter wheel through a like cycle including a like number of angular increments beginning with a zero position initially in register with the counter wheel zero position; means operative between the wheels as a yielding driving connection normally maintaining the register of the zero positions of the wheels and tending to cause the wheels to rotate in unison and stressed by turning of one wheel relative to the other to condition the wheels to recover said register, said driving connection including a pair of permanent magnets, one on each wheel, and having their opposite poles so related as to initially register the zero positions of the wheels and to ultimately cause the counter wheel to angularly follow the predetermining wheel to its new zero position; selector means operative to turn the predetermining wheel to establish and fix a new zero position for said predetermining wheel; irreversible drive means disengageable from the counter wheel to release the counter wheel for turning in follow-up relation to the fixed predetermining wheel under action of the driving connection so as to assume the same new zero position and operative when engaged to turn the counter wheel out of its said new zero position relative to the newly positioned predetermining wheel; and means for subsequently disengaging the drive means to again release the counter wheel to recover its new position under action of the stressed driving connection.

4. Mechanism of the class described, comprising: a support; a counter wheel carried by the support for rotation through a cycle including a fixed number of angular increments beginning with a zero position; a predetermining wheel carried by the support coaxially adjacent to and movable relative to the counter wheel through a like cycle including a like number of angular increments beginning with a zero position initially in register with the counter wheel zero position; means operative between the wheels as a yielding driving connection normally maintaining the register of the zero positions of the wheels and tending to cause the wheels to rotate in unison and stressed by turning of one wheel relative to the other to condition the wheels to recover said register, said driving connection including a permanent magnet on at least one wheel and a magnetically attractable portion on the other wheel so related as to initially register the zero positions of the wheels and to ultimately cause the counter wheel to angularly follow the predetermining wheel to its new zero position; selector means operative to turn the predetermining wheel to establish and fix a new zero position for said predetermining wheel; irreversible drive means disengageable from the counter wheel to release the counter wheel for turning in follow-up relation to the fixed predetermining wheel under action of the driving connection so as to assume the same new zero position and operative when engaged to turn the counter wheel out of its said new position relative to the newly positioned predetermining wheel; and means for subsequently disengaging the drive means to again release the counter wheel to recover its new position under action of the stressed driving connection.

5. Mechanism of the class described, comprising: a support; a first member carried by the support for movement through a cycle including a fixed number of increments beginning with a zero position; a second member carried by the support adjacent to and movable relative to the first member through a like cycle including a like number of increments beginning with a zero position initially in register with the first member zero position; selector means operative to move the second member to establish and fix a new zero position for said second member; means operative between the members as a yielding driving connection normally maintaining the register of the zero positions of the members and tending to cause the members to move in unison to the new zero position of the second member and stressable by movement of one member relative to the other to condition the members for registry recover, said driving connection including a pair of permanent magnets, one on each member, and having their poles so related as to initially register the zero positions of the members and to ultimately cause the first member to angularly follow the second member to its new zero position; disengageable means for moving the first member out of its new zero position so as to stress said driving connection; and means for disengaging the disengageable means to release the first member for movement in follow-up relation to the fixed second member under action of the stressed driving connection so as to recover its new zero position.

6. Mechanism of the class described, comprising: a support; a first member carried by the support for movement through a cycle including a fixed number of increments beginning with a zero position; a second member carried by the support adjacent to and movable relative to the first member through a like cycle including a like number of increments beginning with a zero position initially in register with the first member zero position; selector means operative to move the second member to establish and fix a new zero position for said second member; means operative between the members as a yielding driving connection normally maintaining the register of the zero positions of the members and tending to cause the members to move in unison to the new zero position of the second member and stressable by movement of one member relative to the other to condition the members for registry recover, said driving connection including a permanent magnet on at least one member and a magnetically attractable portion on the other member so related as to initially register the zero positions of the members and to ultimately cause the first member to angularly follow the second member to its new zero position; disengageable means for moving the first member out of its new zero position so as to stress said driving connection; and means for disengaging the disengageable means to release the first member for movement in follow-up relation to the fixed second member under action of the stressed driving connection so as to recover its new zero position.

References Cited in the file of this patent

UNITED STATES PATENTS 2,432,727   Crothers _____ Dec. 16, 1947